United States Patent [19]
Hinden et al.

[11] 3,835,285
[45] Sept. 10, 1974

[54] AUTOMATIC RESISTANCE WELDER

[75] Inventors: Milton Hinden; Charles Giannone, both of North Babylon, N.Y.

[73] Assignee: Duro-Dyne Corporation, Farmingdale, N.Y.

[22] Filed: Jan. 12, 1973

[21] Appl. No.: 323,099

Related U.S. Application Data

[63] Continuation-in-part of Ser. No. 281,205, Aug. 16, 1972, Pat. No. 3,762,541.

[52] U.S. Cl.................. 219/98, 219/88, 219/89, 219/125 R, 219/157
[51] Int. Cl....... B23k 9/00, B23k 11/04, B23k 9/12
[58] Field of Search ............................... 219/95–99, 219/124, 125, 157, 88, 89, 110

[56] References Cited
UNITED STATES PATENTS

| | | | |
|---|---|---|---|
| 2,290,344 | 7/1942 | Martin | 219/88 |
| 2,293,393 | 8/1942 | Humphrey | 219/89 |
| 2,300,172 | 10/1942 | Platz | 219/88 |
| 3,019,328 | 1/1962 | Brashear et al. | 219/125 R |
| 3,448,236 | 6/1969 | Spisak | 219/98 |
| 3,591,762 | 7/1971 | Hinder | 219/98 |
| 3,597,572 | 8/1971 | Ettinger et al. | 219/98 |
| 3,723,698 | 3/1973 | Logan et al. | 219/98 |

*Primary Examiner*—J. V. Truhe
*Assistant Examiner*—Hugh D. Jaeger
*Attorney, Agent, or Firm*—Mark T. Basseches; Paula T. Basseches

[57] ABSTRACT

The present invention relates to an automatic resistance welding apparatus for securing insulation material to air conditioning ducts by means of headed metal clips or pins advanced through the insulation material and welded to the ducts. The apparatus includes a grounded support surface on which the metallic duct material is mounted and a welding head mounted on a guide rail in spaced parallel relation to the support surface.

The welding head assembly includes a welding electrode shiftable toward and away from the surface. An operator handle is provided on the welding head, manipulation of the handle being effective to shift the welding head along the rail and, when the head achieves a selected position, to trigger a welding cycle.

The apparatus is characterized by a brake assembly interposed between the rail and the welding head assembly, activation of the apparatus through a welding cycle being preceded by energizing of the brake assembly whereby the position of the welding head relative to the rail is fixed in advance of movement of the weld clip into contact with the insulation or workpiece, and is maintained in such fixed position during formation of the weld.

5 Claims, 13 Drawing Figures

AUTOMATIC RESISTANCE WELDER

This application is a continuation-in-part of application Ser. No. 281,205, filed Aug. 16, 1972, now Pat. No. 3,762,541, entitled Welding Pin Dispensing Magazine.

BACKGROUND OF THE INVENTION

1. Field of the Invention

The present invention is in the field of resistance welding apparatuses and particularly in the field of resistance welding apparatus adapted to secure by a resistance welding method, a pin to a metallic duct or the like by first passing the pin through a body of insulating material, such as glass wool insulation and, after the pin has been brought into contact with the duct, to cause a welded connection to be effected between the pin tip and the duct.

2. The Prior Art

In the copending application above noted, as well as in U.S. Pat. Nos. 3,582,603; 3,591,762; 3,591,763; 3,624,340 and 3,701,878 there are disclosed a variety of apparatuses and methods for securing welding pins to ducts by resistance welding methods. The prior art devices include both manually fed and mechanically guided welding electrodes.

As noted in such prior art disclosures, it is imperative in the course of welding that the pin be maintained in a precise perpendicular relation to the duct material in order to achieve an effective connection between duct and pin. Where the pins in accordance with the desired embodiments, for purposes of economy and otherwise, are fabricated of sheet metal and, hence, are readily bendable, the requirement for accurate feed and the maintenance of a perpendicular relation between the parts during advance of the pin toward the workpiece is particularly critical. Any lateral movements of the electrode head during the latter portions of the feeding stroke or during the welding cycle result in the formation of a weld wherein the connection between the pin and workpiece is poor or non-existent.

SUMMARY OF THE INVENTION

The present invention may be summarized as directed to an apparatus for automatically feeding and attaching welding pins through insulation to an underlying workpiece.

In order to facilitate and expedite application of welding pins, and particularly in order to expedite the application of a line of pins, it is desirable that the welding head be mounted for translatory movement along a rail or the like. As a means of expediting application of the pins, it is likewise desirable that the operator be permitted to adjust the position of the head relative to the workpiece by means of an operating handle, which operating handle may be shifted to initiate a welding cycle when the desired position is achieved.

It has been discovered that where an operator grips an operating handle, shifts the welding head to a desired position over the workpiece and thereafter shifts the handle to initiate a welding cycle, there is a substantial tendency for the operator to move the welding head relative to the guide rail in the course of the weld being performed.

As noted above, even slight movements of the welding head relative to the workpiece, if occurring during the weld formation, result in an inferior or no connection.

It has further been discovered that the undesirable conditions may be cured by providing in an automatic welding apparatus of the type in which a welding head may be shifted for positioning of weld pins, a brake interposed between the weld head and support rail which automatically locks the head to the rail in advance of the welding stroke, whereby inadvertent movements during formation of the weld or during feeding movement of the pin toward the workpiece are automatically prevented.

The apparatus includes a welding head which is movably mounted on a horizontal guide rail to permit the head to be positioned above a selected portion of a workpiece, the apparatus thus being susceptible of rapid shifting along a linear path. Means are provided for activating a welding electrode carried by the head through a welding stroke toward the workpiece.

The apparatus is characterized by a brake means interposed between the rail and the welding head and so connected to the feed circuitry that the brake means locks the head against movement relative to the rail after the device has been energized for performance of a welding cycle and before the welding electrode may be shifted toward the workpiece. Immediately after performance of the welding operation the brake means is released.

As a result, there is provided an apparatus wherein an operator may readily shift the welding head to a selected position above the workpiece, energize the weld apparatus through the use of a single control arm selectively effective to locate the welding head and trigger a welding cycle, the brake means assuring that there is no possibility of inadvertent translatory movement of the welding head at any period during the cycling operation, which movement could result in a lateral shifting of the welding pin and workpiece or insulation.

Accordingly, it is an object of the invention to provide a welding apparatus having an automatic feeder for welding pins wherein headed individual pins in a stack are removed from the stack, advanced to a welding electrode and welded to a workpiece.

A further object of the invention is the provision of a device of the type described wherein the welding apparatus is movably mounted on a support rail, the apparatus including a brake mechanism interposed between the rail and the welding head, the brake being effective automatically to lock the head against movement along the rail after initiation of the welding cycle, and release the head for translatory movement after completion of a welding cycle.

Still a further object of the invention is the provision of an automatic welding apparatus of the type described wherein an operating handle may be used to shift the welding head to a selected position above the workpiece, and thereafter to trigger a welding cycle, the brake mechanism being effective to lock the welding head against movement relative to the rail notwithstanding inadvertent pressures may be exerted against the operating handle after initiation of the welding cycle, which pressures might otherwise be effective to move the head along the rail.

To attain these objects and such further objects as may appear herein or be hereinafter pointed out, reference is made to the accompanying drawings, forming a part hereof, in which:

Figure 1:
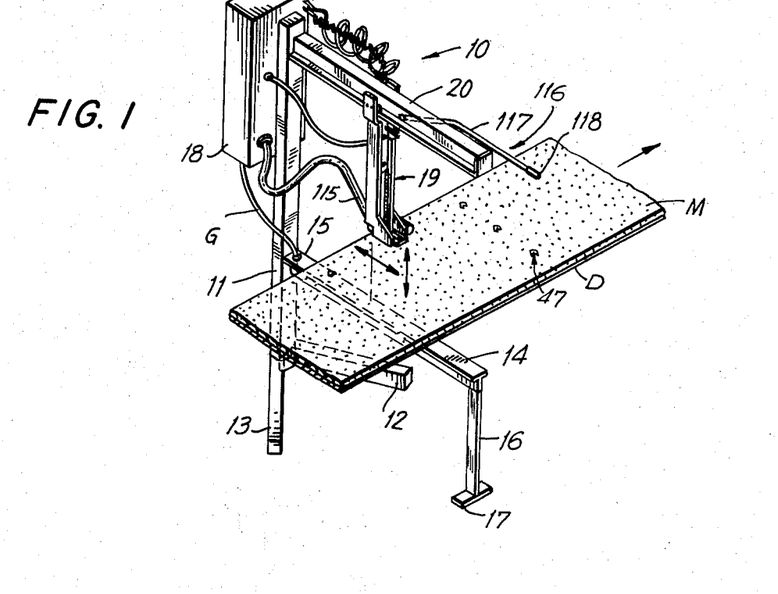
FIG. 1 is a perspective view of welding apparatus in accordance with the invention.

Turning now to the drawings, there is disclosed in FIG. 1 an automatic welding apparatus 10 including a vertical stanchion 11 mounted on a pair of horizontally directed support feet 12, 13. A horizontal work support 14 is fixed to the stanchion 11 at 15, the work support 14 including an independent leg 16 and stabilizer foot 17. At 18 there is shown an essentially conventional welding apparatus including the usual transformer and weld timer mechanism, the ground electrode of the welder being connected by cable G to conductive support 14.

A welding head assembly 19 is movably mounted for translatory movement along the upper support rail 20. The support rail 20 is disposed in parallel alignment with the support surface 14.

Figure 4:
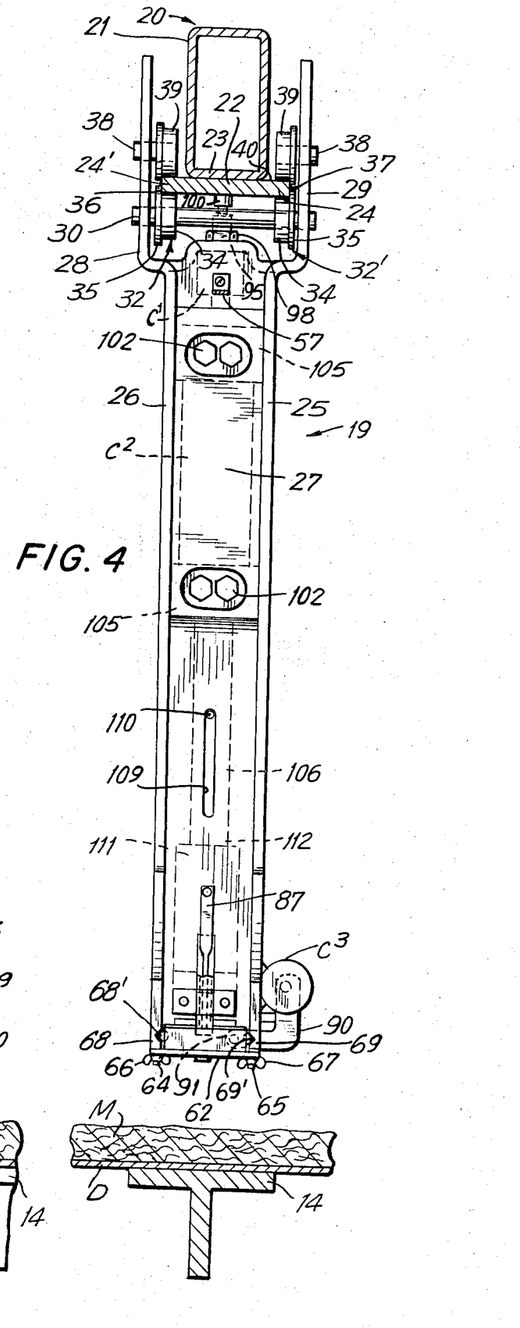
FIG. 4 is a sectional view taken on the line 4—4 of FIG. 3.

As best appreciated from an inspection of FIG. 4, the support rail 20 includes a rectangular tubular section 21 fixed, as by welding, to the stanchion 11. A horizontally directed web 22 is secured to the lowermost wall portion 23 of the support rail 20, the web 22 being of greater transverse dimension than the rail 20, to provide laterally extending elongated guide flanges 24', 24.

Figure 3:
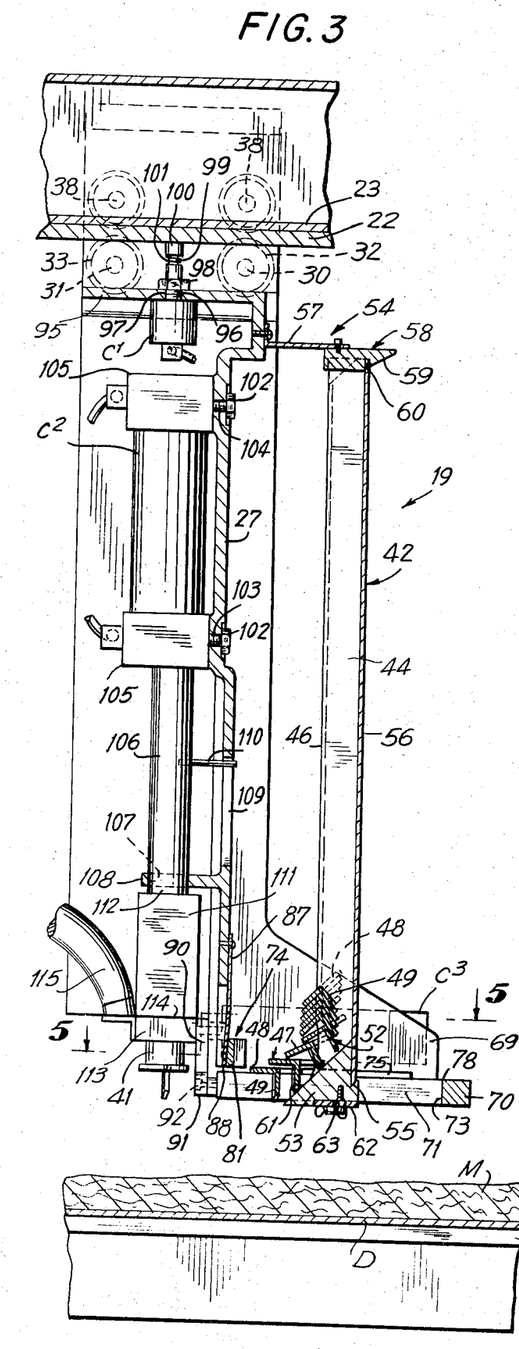
FIG. 3 is a magnified vertical sectional view taken on the line 3—3 of FIG. 1.

The welding head assembly 19 includes vertically directed side walls 25, 26, the head being generally U-shaped in horizontal section, the walls 25, 26 being connected by back wall 27 (FIG. 3). At the upper edge of the walls 25, 26 there are formed parallel extensions 28, 29, respectively, which extensions surround the sides of the rail 20.

A pair of horizontal cross shafts 30, 31 straddle the extensions 28 and 29, each said shaft carrying a spaced pair of guide rollers 32, 32' and 33, 33', respectively.

The guide rollers 32, 32', 33, 33', which are fixed against axial movement relative to the shafts 30, 31, include reduced diameter portions 34 which rollingly engage against the under surface of the flanges 24' and 24 of the web 22 immediately adjacent the lateral side edges of the web.

The rollers 32, 32', 33, 33' include, in addition, circular guide flanges 35, 35 which lie adjacent the lateral side edges 36 and 37 of the flanges 24, 24', respectively, of web 22, to prevent lateral relative movement between the web 22 and the weld assembly 19.

The extensions 28, 29, in addition, carry four stub shafts 38 which, in similar fashion, carry upper flanged rollers 39 engaging against the upper surface 40 of web 22, with the flanges adjacent the side surfaces 36, 37 of the web. It will be understood that the weight of the welding assembly is carried by the upper rollers 39, the weld assembly being supported for translatory movement along the guide rail while being prevented from lateral movement as well as upward movement under the reactive downward pressures exerted by the welding electrode, in the manner hereinafter set forth.

The welding head assembly 19 includes feed mechanism operative serially to extract individual weld pins from a replaceable magazine and feed the same to a welding electrode 41. The magazine and welding pins need not be described in detail, the same being fully illustrated and described, respectively, in pending application Ser. No. 281,205 and U.S. Pat. No. 3,701,878.

Figure 5:
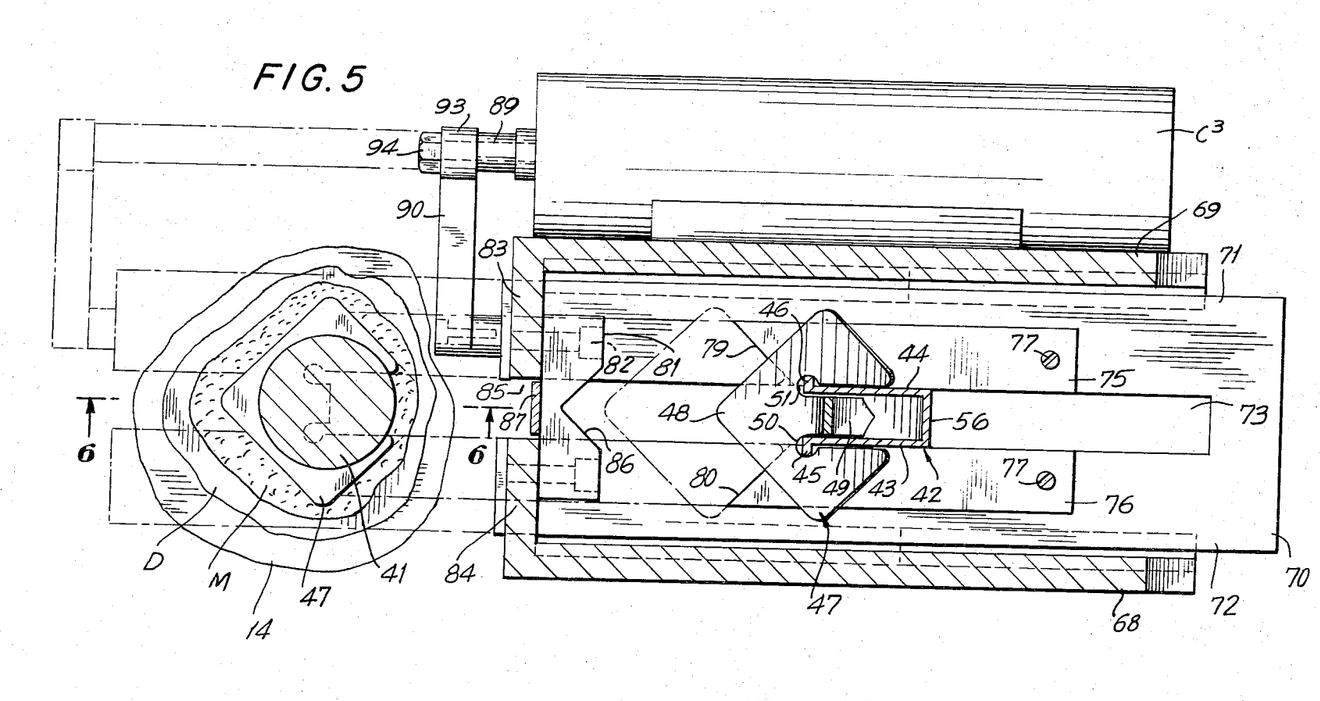
FIG. 5 is a further magnified horizontal section taken on the line 5—5 of FIG. 3.

Briefly, as best seen in FIGS. 3 and 5, the magazine comprises an elongated sheet metal container 42 which is generally U-shaped in horizontal section (see FIG. 5), the legs 43, 44 of the U section including outwardly directed lips 45, 46.

The weld pins or clip members 47 include head portions 48 and shank portions 49 integral with and bent at right angles to the head. The weld pins, in the head components thereof, are providing with enlarged recesses 50, 51, provkding clearance for the lips 45 and 46, respectively, of the magazine 42.

As best appreciated from an inspection of FIG. 5, the interengagement of the lips 45, 46 within recesses 50, 51 permit the pins, which are angularly stacked relative to the magazine 42, to be shifted longitudinally of the magazine without being removable in a lateral direction.

The lips 45, 46, as explained in the copending application, are terminated short of the feed zone 52 (FIG. 3) whereby the pins or clips may be shifted laterally clear of the magazine in such zone.

The magazine 42 is mounted in position on the machine between guide block 53 and magazine retainer assembly 54. The guide block 53 enters into the channel between the legs 43, 44 of the magazine and includes adjacent its lower edge a notch 55 engaging against the central branch or back wall 56 of the magazine.

The upper end of the magazine is mounted by the spring loaded retainer assembly 54, the same including a spring arm 57 fixed to an outer wall portion of the welding head assembly, the spring arm carrying at its outermost edge a latch mechanism 58. The latch mechanism 58 includes a cam surface 59 leading to downwardly directed retainer slot 60. The latch mechanism 58 is biased downwardly by spring 57.

It will be appreciated from the foregoing that a magazine is loaded into position on a magazine assembly by first locating the lowermost edge of the magazine in the notch 55 of the block 53, and thereafter pivoting the uppermost end of the magazine against the cam surface 59, whereby the latch 58 is biased upwardly until the slot 60 thereof is in registry with the uppermost edge of the magazine, whereupon the same snaps downwardly to support the magazine 42 in an essentially vertical disposition.

It will be appreciated that after the supply of pins in a given magazine is exhausted, the magazine may be removed for replacement by simply lifting the latch 58, swinging the magazine clear of the head.

The block 53 includes an inclined guide surface 61 for engagement against the lowermost tip portions of the shanks 49 of the welding pins, guiding the same, as shown in FIG. 3, from the magazine assembly to a position whereat the head portions of the pins are horizontally disposed and the shanks 49 vertically disposed.

The block 53, as best seen in FIGS. 3 and 4, is mounted on a cross bar 62, which bar is provided at its side edges with adjustment slots 63. The bar is fixed in position by passing the adjustment slots over downwardly directed threaded studs 64, 65, depending from the side guides 68, 69, wing nuts 66, 67 clampingly securing the cross bar to the lower edges of the guides 68, 69. It will be appreciated that the clearance slots 63 provide a degree of adjustment of the block longitudinally with respect to the guides 68, 69, such adjustment being necessary to accommodate welding clips having different shank lengths, it being understood that for shorter shanked clips the block will be moved closer to the weld electrode, and vice versa.

The side guides 68, 69 are provided with horizontally directed guide slots 68', 69'. A clip feed slide 70 of bifurcated configuration (see FIG. 5) is horizontally slidably mounted within the guide slots 68', 69' for horizontal shifting movement. The feed slide 70 includes side legs 71, 72, defining therebetween a clearance slot 73 through which the shank portions 49 of the weld pins 47 are free to pass. As best seen in FIG. 3, the weld pins are tightly nested or stacked within the magazine 42 and become spread apart and angularly related one to the other in the transition area 52, the pins again stacking intimately with their head portions and shanks horizontally and vertically disposed as they reach a position adjacent the out feed zone 74.

Feeder slide 70 is provided with a pair of pusher plates 75, 76, fastened as by machine screws 77, 77 to the upper face 78 of the slide. As best appreciated from an inspection of FIG. 3, the thickness of the plates 75, 76 is slightly greater than the thickness of the metal of the head portions of the welding pins.

The pusher plates 75, 76 are provided at their leading edges with inclined drive shoulders 79, 80, the inclination of the drive shoulders matching the angle of the sides of the head of the welding pins. The drive shoulders 79, 80 in the retracted position (solid lines, FIG. 5) are spaced from the lead edge alignment block 81 a distance to permit the head portion of the lowermost welding pin to rest against the upper surface 78 of the slide plate 70. The lead edge alignment block 81 is secured as by machine screws 82, 82 to spaced flanges 83, 84 formed at the forward end of the welding head assembly.

It will be appreciated that the flanges 83, 84 define a clearance space 85 therebetween of sufficient width to permit the passage therethrough of the shanks of the weld pins. Preferably the apertures in the block 81 through which mounting screws 82 pass are elongated in a vertical direction, to permit adjustment of the block in a vertical direction toward and away from the upper face 78 of the slide bar 70 to assure clearance permitting passage of one but not two clips. The block 81 is, in addition, provided with a rearwardly facing, vertically arranged "V" configuration at 86, to align the lead edges of the welding pins.

A wiper spring 87 is fixed to the welding head assembly, the lowermost edge 88 of the spring extending into the slot 85 in the path of the lead edge of the lowermost welding pin.

From the foregoing it will be appreciated that when the feed slide 70 is shifted from the retracted position (solid lines, FIG. 5) to the extended position (dot and dash, FIG. 5), the lead weld pin is carried forward by the drive shoulders 79, 80 (i.e. from right to left) until it is disposed beneath the weld electrode 41. In the course of such movement, the head portion of the pin is maintained in a flatwise orientation by the wiping pressure exerted by the spring 87 against the upper surface of the head portion of the pin.

Motive power for effecting driving of the slide 70 through its clip feeding and retracting stroke is provided by clip feed cylinder $C^3$. Cylinder $C^3$ is of the double acting type, as will be more fully explained in connection with the ensuing description of the control circuitry.

The piston rod 89 of the clip feed cylinder $C^3$ is secured to an L bracket 90, the cylinder $C^3$ being secured, as by welding or the like, in a horizontal position to the welding head assembly 19. As best seen in FIG. 4, the bracket 90 is offset in such manner as to permit it to reciprocate to a position beyond the welding electrode 41 when the latter is in its raised position without interference between the noted parts.

The lower horizontal arm 91 of the bracket 90 is secured as by bolts 92 to the lead edge of the feed slide 70, the upper arm 93 of the bracket being fixed to the piston rod 89 by bolt 94.

The weld electrode 41 is provided with a powerful permanent magnet insert (not shown) so that upon retraction of the slide assembly from the dot and dash to the solid line position of FIG. 5, the weld clip which was advanced to a position beneath the electrode will have been lifted off and retained on the electrode.

A brake cylinder $C^1$, preferably comprising a single acting pneumatic cylinder assembly, is secured to cross bar portion 95 at a position substantially centrally of the guide rollers 32, 32', 33, 33'. The cylinder $C^1$ includes a threaded collar 96 extending through an aperture 97 in the cross bar portion 95, a lock nut 98 securing the cylinder $C^1$ in the desired position.

Piston rod 99 vertically shiftably extends from the cylinder $C^1$, the rod 99 being capped by an anti-friction foot 100 which preferably is comprised of a yieldable rubber or neoprene material. A tension spring 101 is linked between the rod and the collar in such manner as normally to maintain the piston rod at its telescoped position within the cylinder $C^1$.

It will be appreciated that when pressure is admitted to the cylinder $C^1$ in such manner as to extend the rod 99 from the cylinder, the anti-friction foot 100 will be pressed against the under surface of the web 22, locking the welding head assembly against translatory movement along guide rail 20.

The electrode 41, as previously noted, is shiftable toward and away from the duct or like workpiece D mounted on the support member 14. The movement of the electrode is effected by the double acting weld cylinder $C^2$.

The weld cylinder $C^2$ is fixed within the weld head housing 19 by mounting bolts 102 extending through vertically aligned apertures 103, 104 formed in the back wall 27 of the weld head assembly. It will be appreciated that the cylinder $C^2$ is provided with upper and lower enlarged bosses 105 having tapped apertures to receive the bolts 102.

Piston rod 106 of cylinder C² extends through guide aperture 107 formed in a transverse flange 108 extending from the back wall 27 of the assembly — see FIG. 3. A vertical slot 109 is formed in the wall 27, a guide pin 110 being fixed to the piston rod 106 and extending horizontally outwardly through the slot 109 to prevent any rotary movement of the piston rod 106. An insulated carrier yoke 111 is fixed to the lower end 112 of the piston rod 106.

The welding electrode 41 is mounted to a heavy copper conductor 113 secured to the lowermost end 114 of the block 111, a conduit 115 connected to the ungrounded lead from the secondary of the welding transformer being secured to the conductor 113, to conduct welding current to the electrode.

Figure 2:
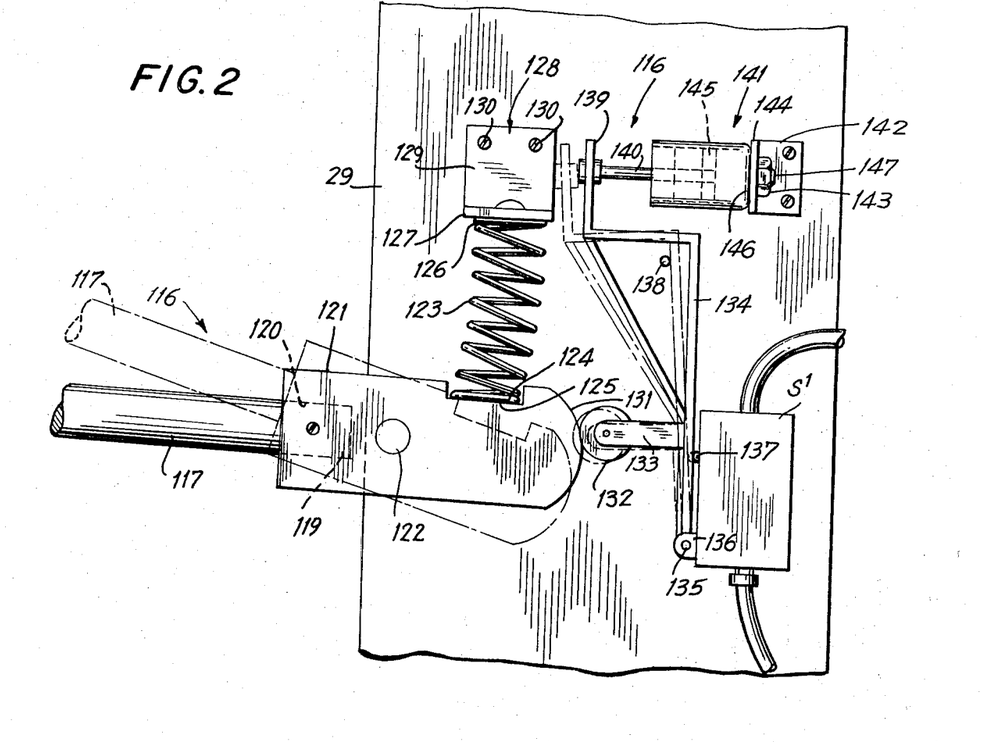
FIG. 2 is a magnified detail view of the trigger mechanism for initiating operation of the pin feed and welding cycle.

The trigger assembly 116 for initiating a pin feed and welding cycle is best illustrated in FIG. 2. The trigger assembly includes an operator handle 117 in the form of an elongated bar having an insulated trip portion 118.

The innermost end 119 of the bar is fixedly secured within a mounting aperture 120 formed in trip head 121, fulcrumed to the extension 29 at the upper end of the weld head assembly by a horizontal pivot pin 122 projecting outwardly from the extension 29.

The operator handle 117 is normally maintained in the dot and dash position, FIG. 2, by counter balance coil spring 123, the lower end 124 of which spring is disposed within notched spring seat 125 at the upper edge of the head 121. The upper end 126 of the spring 123 is biased against horizontal leg 127 of L bracket 128, made fast to the extension 129 by mounting bolt 130.

It will be appreciated that the force of the spring is selected to be sufficient to maintain the arm 117 in a clockwise rotated position despite the imbalance resulting from the major mass of the arm 117 being forwardly disposed as respects the pivot 122.

The arm 117 provides a means for adjusting the position of the welding head assembly 119 forwardly and rearwardly along rail 20 as well as a means for triggering a feed and welding cycle by a counter-clockwise movement of the arm to the solid line position shown in FIG. 2.

The trip head 121 is provided at its forwardmost head portion with an operator cam face 131. The cam face is positioned, upon counter-clockwise rotation of the arm, to engage a follower roller 132 mounted on leg 133 of the switch operator arm 134 and drive the switch operator arm from the dot and dash to the solid line position shown in FIG. 2. The switch operator arm 134 is pivoted at its lower end 135 to a hinge 136 mounted to air switch S¹.

The switch S¹ includes spring loaded trip button 137 which is biased to project from the casing of switch S¹ and normally force the switch operator arm 134 in a counter-clockwise direction to the dot and dash position, FIG. 2. Locator finger 138, extending from extension 29, is positioned to maintain the arm 134 from undue anti-clockwise movement.

The switch arm 134 includes an upwardly directed extension finger 139, to which finger is fixed the damper plunger rod 140 of a dash pot assembly 141. The dash pot assembly is mounted on L bracket 142 by mounting nut 143 which extends through the horizontal arm 144 of the bracket. The dash pot includes a piston head 145 secured to the innermost end of the rod 140, the piston head including a one way valve (not shown) which permits the piston to move toward the closed end 146 of the dash pot assembly, without compressing the air within the dash pot, the valve closing upon movement of the piston away from the end 146. A variable bleed valve 147 is formed in the closed end 146 of the dash pot.

From the foregoing it will be evident that upon depressing the operator handle 117, the cam portion 131 of the trip head 121 will engage against follower roller 132, causing a clockwise movement of the switch arm 134 against the outward biasing pressure of the spring biased operator button 137 of the switch S¹. Clockwise movement of the arm 134 will carry the piston rod 140 and its associated piston 145 toward the right or closed end 146 of the dash pot.

When the arm 117 is released and returns to the dot and dash position under the influence of spring 123, the switch arm 134 is urged in a return or anti-clockwise direction by the spring biased plunger 137, movement in the anti-clockwise direction, however, being retarded by the action of the dash pot assembly 141. The speed of return movement may be governed by the adjustment of the valve 147 of the dash pot, it being evident that if a slower return is desired, the valve should be adusted to reduce the size of the aperture of the valve, and vice versa.

Referring now to FIGS. 7 to 13, there will be described in stepwise fashion the circuitry employed in the operation of the apparatus. For purposes of facilitating an understanding of the operating sequence, the pneumatic lines which are pressurized have, in each step, been displayed in darkened solid lines, to contrast with the non-pressurized lines.

Figure 7:
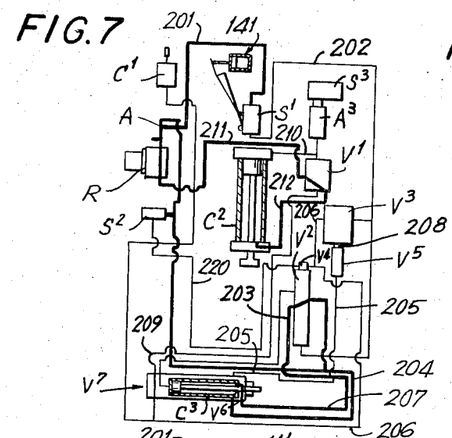
FIGS. 7 to 12 are schematic views of the circuitry for driving the weld apparatus through an operative cycle.
Figure 8:
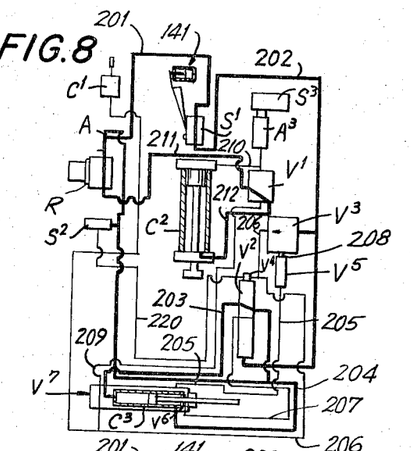

The diagrammatic showing of FIG. 7 discloses the position of the parts in the dormant condition of the machine. When the handle 117 is depressed, control switch S¹ is activated, sending air pressure from inlet A through line 201 and the valve V¹ to line 202, activating valve V² (FIG. 8). The introduction of air through line 202 into the valve V² switches the valve, feeding air through line 203 to the rear of clip feed cylinder C³.

As previously noted, extension of the clip feed cylinder causes slide assembly 70 to pick up the lowermost clip, advancing the same forwardly to a position beneath the weld electrode 41, whereat the magnetic attraction in the permanent magnet component of the electrode lifts the pin clear of the slide. The parts are now disposed in the position shown in FIG. 9.

Figure 9:
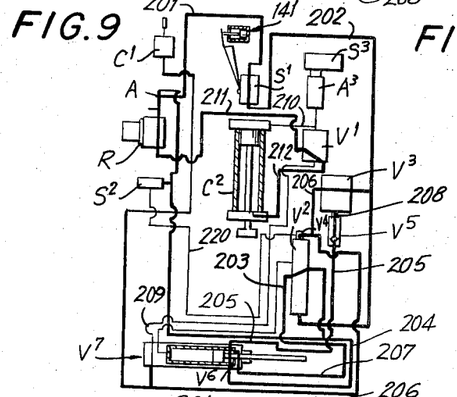
Figure 10:
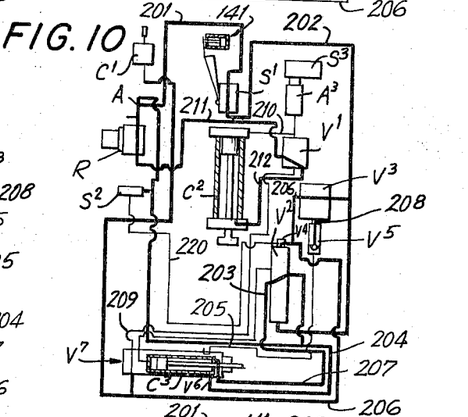

When the feed cylinder C³ is in the full forward (FIG. 9) position, valve V⁶ in the forward end of cylinder C³ opens, allowing air to pass through from pressurized line 204 to line 205, and thence through check valve V⁵, shifting valve V³ (FIG. 9 position). Movement of the valve V³ admits air under pressure to line 206, in turn shifting the position of valve V², whereupon air is directed through line 207 to the front of clip feed cylinder C³, causing the same to retract (from FIG. 9 position toward FIG. 10). At the same time air through line 206 is admitted to brake cylinder C¹, causing the piston rod 99 of the cylinder to be shifted upwardly, urging the anti-friction foot 100 against the web 22, to lock the welding head and carriage 19 against movement relative to the rail 20. Upon initial retractile movement of the piston within cylinder C³, the valve V⁶ (FIG. 10) opens the connection between lines 204 and 205, removing air from check valve V⁵. Check valve V⁵ nonetheless remains seated, maintaining the pressure in line 208, thus retaining valve V³ in the position shown in FIGS. 9 and 10, whereby pressure continues to be admitted to line 206.

Figure 6:
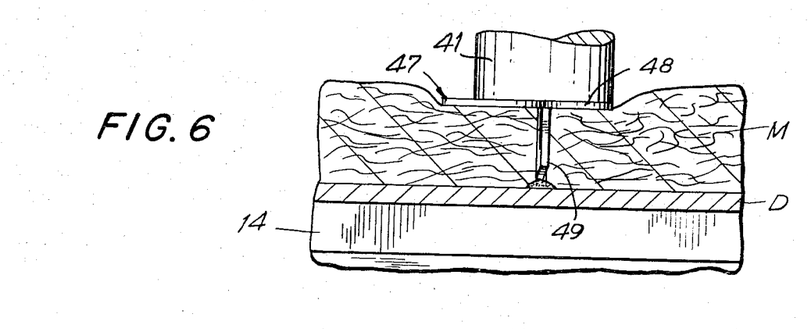
FIG. 6 is a vertical sectional view of a welding pin in attached position to the workpiece.
Figure 11:
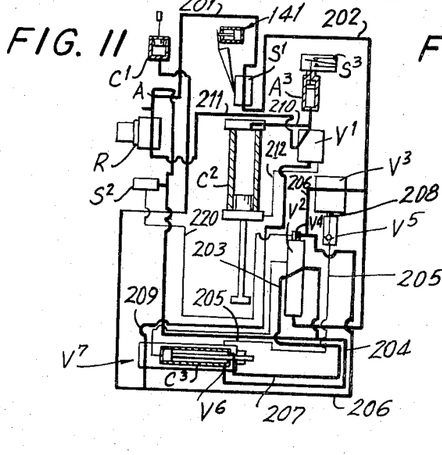

When the piston in the clip feed cylinder C³ reaches the fully retracted position (FIG. 11), valve V⁷ in the trailing end of the cylinder opens, communicating pressure through line 206 to line 209, allowing air to flow to the pilot of valve V¹, the valve being thus shifted to admit air, the pressure of which is controlled by regulator R through the valve V¹ to line 210 and thus to the top of the weld cylinder C2, driving the weld cylinder piston and, hence, the weld electrode 41 downwardly (FIG. 11). Downward movement of the weld piston will force the clip carried by electrode 41 through the insulation material M (FIG. 6), bringing the tip of the weld pin into electrical contact with the workpiece or duct D.

The air admitted to line 210 simultaneously actuates air switch control A³, closing microswitch S³ which is operatively connected to the welding apparatus 18, causing the apparatus to energize the primary of the welding transformer for a predetermined time period governed by the setting imparted to the weld apparatus.

Air switch A³ is preferably pressure responsive, being adapted to close only after a preselected high pressure is achieved. The actuating pressure needed to close switch A³ is selected to be sufficiently high to prevent the switch from closing until the tip of the fed clip engages the work piece, blocking further extension of the piston in cylinder C², permitting for the first time a build up of back pressure sufficient to trip switch A³. A weld can thus not be initiated until the clip is forced against the workpiece with a predetermined pressure. Since initiation of the flow of weld current is thus pressure responsive, no adjustments need be made when shifting to clips of different shank lengths.

It will be appreciated that during the preceding operations the air switch S¹ has been maintained in activated position under the retaining influence of the dash port assembly 141, the setting of the bleed valve 147 of the dash pot assembly being adjusted to provide ample time for completion of the noted steps.

Figure 12:
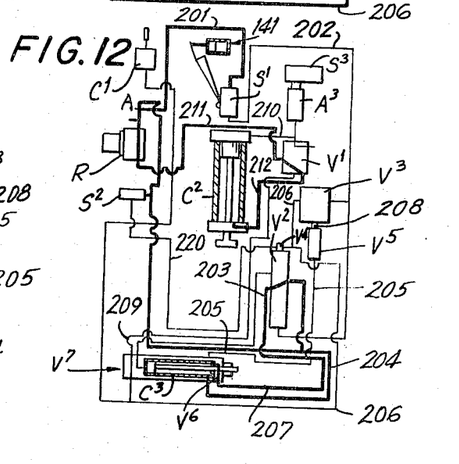
Figure 13:
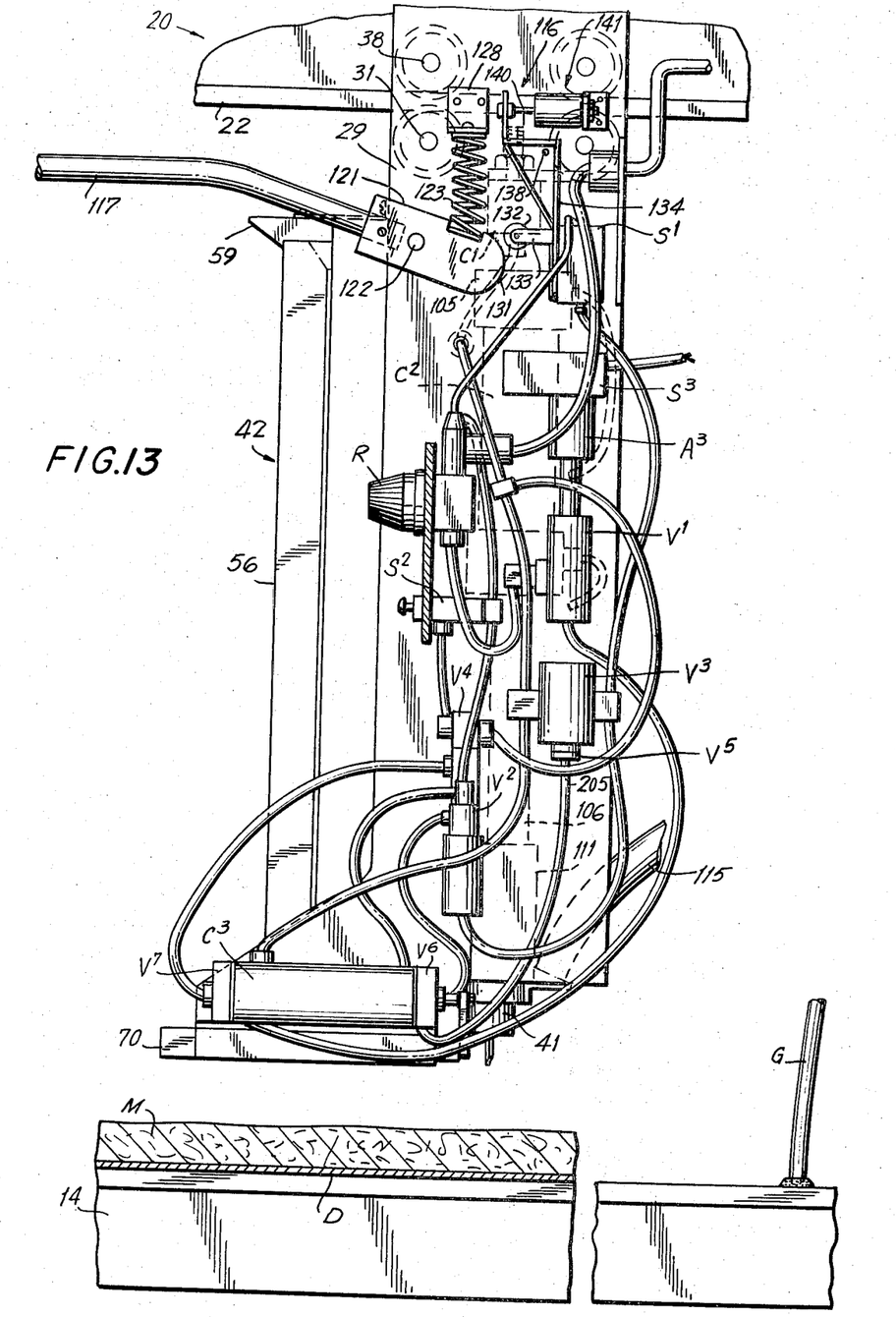
FIG. 13 is a side elevational view of the control assembly of the apparatus.

When the dash pot is ultimately released, permitting the air switch S¹ to return to its anti-clockwise or idle position, air flow to the line 202 is interrupted and the same is vented to the atmosphere. The valve V³ is thus opened, interrupting the venting of air in line 206 (FIG. 12). The change in position of valve V³ relieves the pressure on the pilot of valve V¹ (through open valve V⁷), causing the same to shift, admitting air to line 211 through the valve V¹ to line 212 leading to the under side of the piston of the weld cylinder C², causing the same to be lifted within the cylinder C², the collected air in the cylinder C² being vented through line 210 through valve V¹.

In like manner, the air in the control A³ is vented through the valve V¹. Venting of line 206 likewise permits the piston rod 99 of brake cylinder C¹ to be retracted to the interior of the cylinder by the tension spring 101, removing the pressure foot 100 from contact with the web 22.

As will be appreciated, the above described operation leaves the parts in the original or idle condition, ready to be again energized by activation of the operating handle 117.

A manual override retractor switch S² may be provided for purposes of shifting the piston of clip feed cylinder C³ in a retractile direction in case of a jam. Switch S² is connected to shift the position of valve V² by admitting air through line 220. The valve V² will thereupon pressurize line 207, retracting the piston of cylinder C³, air being vented from the rear of the cylinder through line 203 and out valve V².

It will be evident that variations in the circuitry described may be made without departing from the spirit of the invention, which is not directed to the circuitry per se except to the extent defined in the appended claims. It is, however, important that any selected circuitry energize the brake cylinder C¹ to the locking position of the welding carriage in advance of a pin carried by the welding electrode 41 being shifted into contact with the insulation or the workpiece. By way of example, since the forces which retain a welding pin to the electrode 41 are merely magnetic forces, any movement of the weld head after penetration of the tip of the clip into the insulation would be effective to clear the clip from its connection to the welding head.

As will be evident from the foregoing description, there is disclosed in the present application an automatic resistance welding apparatus of simple design wherein welding pins from a magazine may be serially connected to a duct. The apparatus is simple to use and is foolproof, especially in that a single operating handle may be employed for locating the welding head relative to the duct and for initiating a welding cycle, the interposition of the brake mechanism and its interconnection into the energizing circuitry being so coordinated and arranged as automatically to lock the welding head to the head support rail in advance of welding pins being forced through the insulation material and into welding position against the workpiece.

It will be further appreciated that the utilization of a pressure actuated switch (S³) as the means for triggering a welding cycle, the pressure switch being responsive to pressure build up in the weld clip drive cylinder, assures that the weld will be formed only after the clip is engaged against the workpiece with a selected desired pressure, since if the clip is not pressed against the workpiece with suitable force sufficient back pressure to energize switch S³ cannot be developed. This feature, in addition, permits utilization of welding pins of a variety of shank lengths without the necessity of adjusting the stroke of the weld cylinder.

It will be readily recognized that a variety of changes and modifications will occur to those skilled in the art and familiarized with the instant disclosure and, accordingly, the invention is to be broadly construed within the scope of the appended claims.

Having thus described the invention and illustrated its use, what is claimed as new and is desired to be secured by Letters Patent is:

1. Automatic resistance welding apparatus for advancing a welding pin releasibly mounted on an electrode through an insulating batt and into contact with a workpiece and thereupon effecting a resistance weld between said pin and workpiece comprising, in combination, a frame, a work support surface on said frame, a guide rail on said frame in parallel spaced relation to said support surface, a welder carrier assembly mounted on said rail for translatory movement therealong, a welder assembly mounted on said carrier, said assembly including electrode means shiftable toward and away from said surface in a direction perpendicular thereto between welding and retracted positions, linear motor means interposed between said welder assembly and said electrode for moving said electrode in said direction, trigger means for activating said linear motor means, stop means independent of said linear motor means operatively connected between said carrier and said guide rail shiftable between coupling and releasing positions, respectively locking said carrier against and freeing said carrier for sliding movement relative to said rail, said stop means being normally disposed in said releasing position whereby said carrier is normally shiftable along said rail, said trigger means being operatively connected to shift said stop means to the coupling position thereof in advance of activating said linear motor means for movement from said retracted to said welding position.

2. The resistance welding apparatus of claim 1 wherein said stop means comprises an air cylinder assembly fixed to said carrier assembly, said cylinder assembly including a piston rod shiftable toward and away from said rail.

3. The apparatus of claim 2 and including a resilient anti-friction foot on said piston rod positioned to engage a portion of said rail in said coupling position of said stop means.

4. The apparatus of claim 1 and including powerized pin feed means for serially feeding weld pins from a magazine to said electrode, means responsive to the completion of the operation of said pin feed means for actuating said linear motor means, said stop means being shifted to said coupling position during operation of said pin feed means and being shifted from said coupling to said releasing position following movement of said linear motor means away from said surface.

5. A device in accordance with claim 1 wherein said electrode means includes permanent magnet means for yieldingly supporting a welding pin.

* * * * *